Patented Apr. 20, 1926.

1,581,851

UNITED STATES PATENT OFFICE.

MARTIN L. MARTUS, OF WOODBURY, AND EDMUND H. BECKER, OF WATERBURY, CONNECTICUT.

BATTERY CELL.

No Drawing. Application filed February 13, 1925. Serial No. 9,031.

*To all whom it may concern:*

Be it known that we, MARTIN L. MARTUS and EDMUND H. BECKER, citizens of the United States, said MARTUS being a resident of Woodbury, in the county of Litchfield and State of Connecticut, and said BECKER being a resident of Waterbury, in the county of New Haven and State of Connecticut, have invented certain new and useful Improvements in Battery Cells, of which the following is a specification.

This invention relates to battery cells; and it comprises a cell of the copper oxid type having positive electrode and negative electrodes and a liquid caustic alkali solution as electrolyte, such electrolyte being usually caustic soda; and said cell further containing either silica or alumina in a reactive form, or both silica and alumina in a reactive form; all as more fully hereinafter set forth and as claimed.

In primary cells of the copper oxid type, it is usual to employ a caustic soda electrolyte and a depolarizer body of, or comprising, copper oxid. Sometimes, the copper oxid is used in loose, granular form in a bag or container and sometimes it is formed into more or less compact integral bodies. In whatever form it is employed, it is as a more or less porous or permeable mass to allow penetration of the electrolyte. The electrolyte is nearly always a solution of caustic soda; usually around 24-26 Baumé; say, 17 to 20 per cent NaOH. More rarely, caustic potash is used, or a mixture of the two alkalis. Sometimes a little lithia is added. This type of cell is well known and has very many advantages. In use, however, there is a certain amount of deterioration or loss on open circuit; due to the fact that the copper oxid used as a depolarizer, while substantially insoluble in caustic soda solutions of this strength is not absolutely so. The solubility is very little, but to the extent that it exists, there is possibility of detrimental action occurring by reduction of the dissolved copper oxid even on open circuit. The ideal is to have the copper oxid exist as a depolarizing body in which no action takes place until the circuit is closed; and to the extent that copper oxid goes into solution, the ideal is not realized. There is some action on the zinc and occasionally there is development of crystalline copper as trees or bridging bodies, or as suspended particles, which may function as intermediate electrodes. Sometimes, colloid copper is produced in the solution.

It is the object of the present invention to obviate this source of loss and we do it by maintaining in, or in contact with, the electrolyte substances adapted to remove dissolved (or colloid) copper oxid or copper compounds therefrom. In this type of cell the electrolyte exists as a liquid body and it is the purpose of this invention to keep this body stripped of dissolved or dispersed copper in any form which will take part in the electrolytic actions. We do not desire to change the type of cell by changing the character of the electrolyte liquid to any substantial extent; it is our object to use the ordinary electrolyte and keep this electrolyte, so to speak, pure. Either alumina in reactive form, or silica in reactive form may be used or their mutual combinations or their combinations with other substances. Used in small but substantial proportions in cells of the copper oxid type there is more certainty of stability of the cell. Whether the action is due to an actual removal of copper from solution as it dissolves or is due to the conversion of dissolved or suspended copper oxid into inactive forms, it is not necessary to decide. We content ourselves with noting the result obtained, without speculating as to the reason. In securing our end, the silica or the alumina, or both, may be in actual solution in the electrolyte to some extent but advantageously they exist as solid reactive material in some portion of the cell in contact with the electrolyte. Slight proportions either of dissolved silica (as silicate of soda) or of dissolved alumina (as aluminate of soda) may be present in the electrolyte and remain in solution; but to a large extent the two are incompatible; when both are present they precipitate each other although usually not quite completely. The compound of silica and alumina (with some soda) which precipitates when caustic soda solutions of the two are mixed is useful for our purposes. It does not dissolve to any substantial extent in the electrolyte and in its presence the electrolyte is kept free of active copper; which is the result we want. These materials in this form may be commercially obtained, being a form of zeolite used for purifying water, such as the zeolites of the well known Permutit brand. In fact, any of the commercial zeolites used in softening water are useful for our purposes. Those types based on glauconite, while not strictly alumina-silica combinations, are nevertheless available for our purposes. The various zeolites dissolve to some extent in the electrolyte and to some extent remain undissolved. In using these zeolites, many convenient embodiments of our invention may be employed. The solid zeolite may, for example, be incorporated directly in the mass of the depolarizer; or it may be simply put in the same container with the copper oxid, where the latter is contained in a bag, a perforated metal container, etc. Or the solid zeolite may be admixed with the granular soda to be used in making the electrolyte; or it may be put in the solution after it is made. In either event it forms a layer or deposit at the bottom of the liquid in the cell. Even Portland cement which, in hydrated form, contains reactive aluminates and silicates of calcium, may be used for our purposes. Reactive calcium aluminate or calcium silicate may be employed per se.

As stated, we have no particular theory of the action which takes place; but we have noted that where white insoluble zeolites are used in the cell, after a time they become more or less greenish, indicating that they have taken up copper from the solution; and where the agent used is partly in solution, there is often the development of a heavy greenish sediment at the bottom of the jar.

It will be understood that in speaking of alumina and silica in solution or out of solution, we are not using absolute terms. Where both bodies are present, some will be in solution and some not in solution; this depending to some extent upon their ratio, the strength of the caustic solution and other factors. For our purposes, however, it does not seem to be particularly material whether the active body is in or out of solution, so long as it is present and the amount in solution is not sufficient to change the character of the electrolyte substantially. All of the actions here important are slow. Our object is to keep the electrolyte free of dissolved copper or of dissolved copper in an active form; and the various substances mentioned subserve our purposes; they take the copper out of the liquid.

While we have spoken more particularly of caustic soda, it will of course be understood that for our purposes caustic potash is equivalent. Or mixtures of caustic potash and caustic soda may be employed. The relation of these mixtures to copper oxid seems to be about the same as that of caustic soda. If anything, the solvent action of caustic potash is somewhat greater than that of caustic soda. The presence of lithium hydrate does not change the situation. With some lithia in the electrolyte, copper seems to dissolve in about the same way and to about the same extent as in its absence; and the efficiency of the silica or alumina is as great.

In a large sized commercial unit having about, say, 4 or 5 liters of electrolyte, we find it advantageous to add about 50 to 60 grams of any commercial water purifying zeolite. For smaller cells, corespondingly smaller amounts of these bodies may be used. A mixture of silicate of soda and aluminate of soda or aluminate of potash may be used. The quantities stated are merely indicative; we have found that less amounts are effective. Much depends, really, upon the nature of the copper oxid depolarizer used; with dense forms of copper oxid used as a depolarizer, there is less solubility and the necessity for keeping the solution stripped of copper is not as great.

What we claim is:—

1. An electric cell of the copper oxid type having positive electrode and negative electrodes and a liquid caustic alkali electrolyte, said cell also containing zeolite material in contact with said liquid.

2. An electric cell of the copper oxid type having positive and negative electrodes and a liquid caustic alkali electrolyte, said cell also containing in contact with said liquid a zeolite of the water purifying type containing reactive alumina and reactive silica.

3. An electric cell of the copper oxid type having a positive electrode, a negative electrode, and a liquid caustic alkali electrolyte, said cell also containing in contact with said liquid a solid material containing silica in reactive hydrated form.

4. An electric cell of the copper oxid type having a positive electrode, a negative electrode and a liquid caustic alkali electrolyte, said cell also containing in contact with said liquid a solid material containing alumina in hydrated reactive form.

5. An electric cell of the copper oxid type having a positive electrode, a negative electrode, and a liquid caustic alkali electrolyte, said cell also containing silica in reactive hydrated form and alumina in hydrated reactive form, said silica and said alumina existing in the form of a zeolite.

In witness whereof we have hereunto signed our names at Waterbury, Connecticut, this 11th day of February, 1925.

MARTIN L. MARTUS.
EDMUND H. BECKER.